US00RE41054E

(19) United States
(12) Reissued Patent
Nakagawa

(10) Patent Number: US RE41,054 E
(45) Date of Reissued Patent: Dec. 29, 2009

(54) CONTACT LENS CONTAINER

(75) Inventor: Makoto Nakagawa, Nogoya (JP)

(73) Assignee: Menicon Co., Ltd. (JP)

(21) Appl. No.: 29/263,544

(22) Filed: Jul. 25, 2006

Related U.S. Patent Documents

Reissue of:
(64) Patent No.: Des. 518,292
Issued: Apr. 4, 2006
Appl. No.: 29/197,213
Filed: Jan. 9, 2004

(51) LOC (9) Cl. ..... 03-01
(52) U.S. Cl. ..... D3/264; D3/263
(58) Field of Classification Search ..... D3/219, D3/263, 264, 265, 252; 206/5, 5.1, 6
See application file for complete search history.

(56) References Cited

U.S. PATENT DOCUMENTS

D212,480 S * 10/1968 Mead ..... D30/114
D333,093 S * 2/1993 Rehrig et al. ..... D9/456
D357,579 S * 4/1995 Abrams et al. ..... D3/264
D458,023 S * 6/2002 Dzwill et al. ..... D3/264
D485,452 S * 1/2004 Boron et al. ..... D3/469
D496,790 S * 10/2004 Dzwill et al. ..... D3/264

* cited by examiner

*Primary Examiner*—Celia A Murphy
(74) *Attorney, Agent, or Firm*—Rossi, Kimms & McDowell LLP

(57) CLAIM

The ornamental design for a contact lens container [for use in a refrigerator], as shown and described.

DESCRIPTION

FIG. 1 is a top perspective view of a contact lens container [for use in a refrigerator] showing my new design;
FIG. 2 is a front elevational view thereof, the rear side elevation being a mirror image;
FIG. 3 is a right side elevational view thereof, the left side elevation being a mirror image;
FIG. 4 is a top plane view thereof;
FIG. 5 is a bottom plane view thereof; and,
FIG. 6 is a cross sectional view taken along line 6—6 of FIG 4.

1 Claim, 3 Drawing Sheets

Figure 1:
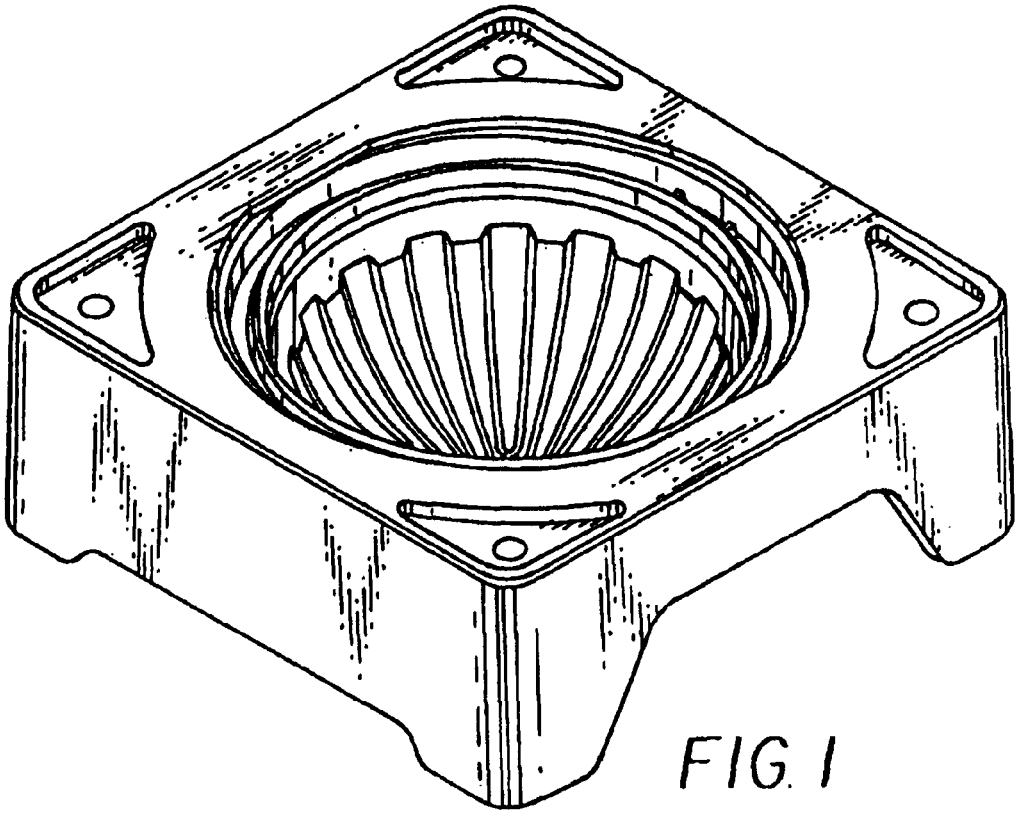
Figure 2:
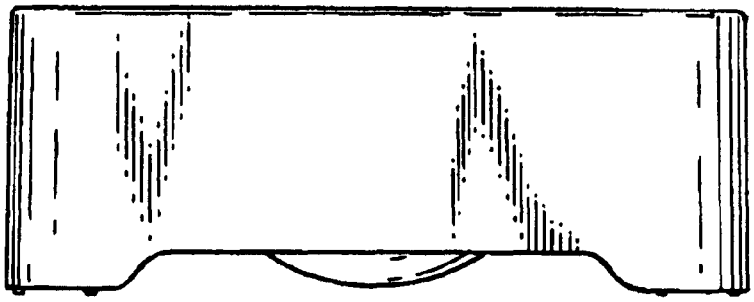
Figure 3:
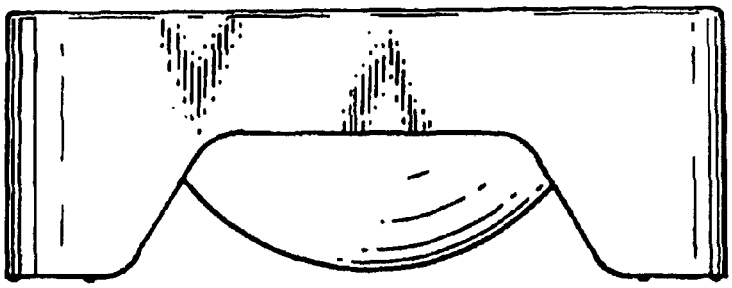
Figure 4:
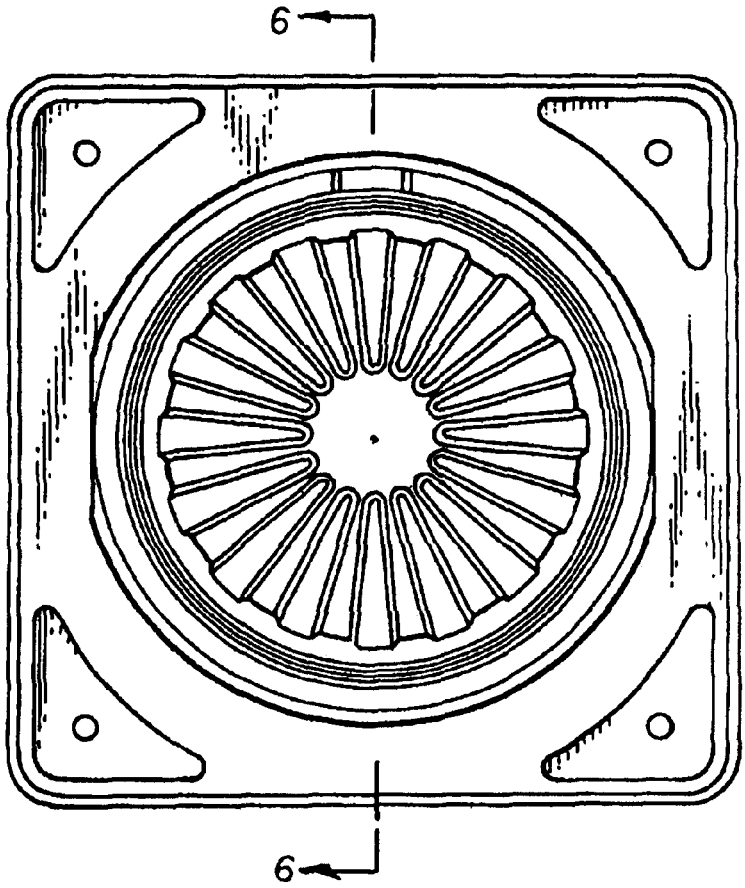
Figure 5:
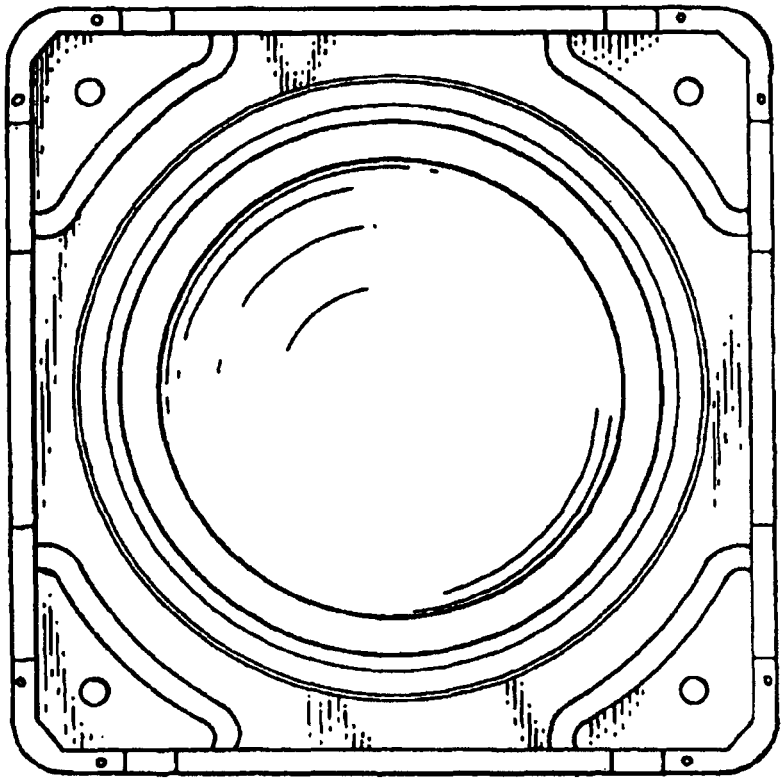
Figure 6:
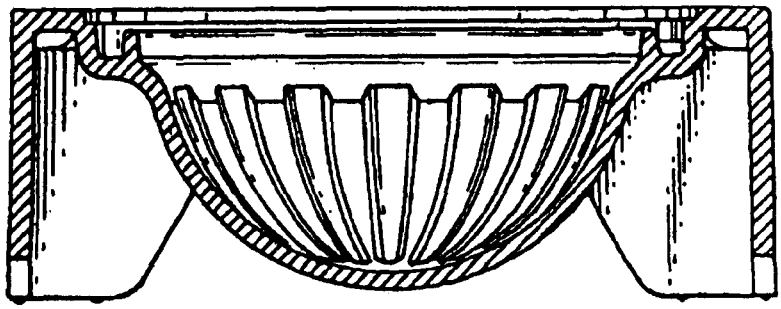

Matter enclosed in heavy brackets [ ] appears in the original patent, but forms no part of this reissue; matter printed in italics indicates the additions made by reissue.